(12) United States Patent
Sasaki

(10) Patent No.: US 11,831,991 B2
(45) Date of Patent: Nov. 28, 2023

(54) DEVICE, CONTROL METHOD, AND STORAGE MEDIUM

(71) Applicant: CANON KABUSHIKI KAISHA, Tokyo (JP)

(72) Inventor: Yoshitaka Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/722,663

(22) Filed: Apr. 18, 2022

(65) Prior Publication Data

US 2022/0239819 A1 Jul. 28, 2022

Related U.S. Application Data

(63) Continuation of application No. 16/898,476, filed on Jun. 11, 2020, now Pat. No. 11,336,834, which is a continuation of application No. PCT/JP2018/046254, filed on Dec. 17, 2018.

(30) Foreign Application Priority Data

Dec. 18, 2017 (JP) ................... 2017-241983

(51) Int. Cl.
*H04N 23/72* (2023.01)

(52) U.S. Cl.
CPC .................. *H04N 23/72* (2023.01)

(58) Field of Classification Search
CPC ........ H04N 5/2352; H04N 1/00; H04N 5/225; H04N 5/232939; H04N 5/2353; H04N 5/2355; H04N 5/243; H04N 5/355; H04N 23/72; H04N 23/633; H04N 23/00; H04N 23/73; H04N 23/741; H04N 23/76; H04N 25/57; G03B 7/28; G03B 15/00

See application file for complete search history.

(56) References Cited

U.S. PATENT DOCUMENTS

| 5,991,105 | A | 11/1999 | Sasaki |
| 6,118,606 | A | 9/2000 | Sasaki et al. |
| 9,615,009 | B1 | 4/2017 | Buchheit et al. |

(Continued)

FOREIGN PATENT DOCUMENTS

| JP | 2005-197952 A | 7/2005 |
| JP | 2009-038479 A | 2/2009 |

(Continued)

OTHER PUBLICATIONS

Feb. 26, 2019 International Search Report in International Patent Appln. No. PCT/JP2018/046254.

(Continued)

*Primary Examiner* — Mekonnen D Dagnew
(74) *Attorney, Agent, or Firm* — Venable LLP

(57) ABSTRACT

A control method for generating a high quality HDR image is provided. A control device of the technique of this disclosure is a control device configured to control an image capturing element capable of controlling an exposure condition for each of areas, the device including: an acquisition unit configured to acquire an exposure value map obtained by preliminary exposure using the image capturing element; and a setting unit configured to set the exposure condition including a shutter speed and an ISO sensitivity for each of the areas based on the exposure value map.

17 Claims, 12 Drawing Sheets

(56) References Cited

U.S. PATENT DOCUMENTS

| | | | |
|---|---|---|---|
| 10,567,638 B2 | 2/2020 | Tsuchiya et al. | |
| 2009/0244319 A1 | 10/2009 | Kim | |
| 2010/0045824 A1* | 2/2010 | Kido | H04N 5/243 |
| | | | 348/E9.053 |
| 2012/0281101 A1 | 11/2012 | Fujinawa et al. | |
| 2015/0229898 A1* | 8/2015 | Rivard | H04N 9/76 |
| | | | 348/223.1 |
| 2015/0271382 A1* | 9/2015 | Sekine | H04N 5/3535 |
| | | | 348/229.1 |
| 2015/0350555 A1* | 12/2015 | Nishi | H04N 5/23293 |
| | | | 348/333.02 |
| 2016/0112644 A1 | 4/2016 | Nishi | |
| 2018/0097988 A1 | 4/2018 | Tsuchiya et al. | |
| 2018/0160021 A1 | 6/2018 | Zhou et al. | |
| 2019/0182419 A1 | 6/2019 | Sekiguchi et al. | |
| 2020/0162662 A1 | 5/2020 | Tsuchiya et al. | |
| 2020/0186695 A1* | 6/2020 | Helweg-Larsen | H04N 23/62 |

FOREIGN PATENT DOCUMENTS

| | | |
|---|---|---|
| JP | 2011-004088 A | 1/2011 |
| JP | 2016-192606 A | 11/2016 |
| WO | 2017/170716 A1 | 10/2017 |

OTHER PUBLICATIONS

Sep. 5, 2023 Japanese Official Action in Japanese Patent Appln. No. 2022-146176.

\* cited by examiner

| EXPOSURE VALUE | SHUTTER SPEED (SECOND) | ISO SENSITIVITY |
|---|---|---|
| -2 | 1/400 | 400 |
| -1 | 1/200 | 400 |
| 0 | 1/100 | 400 |
| 1 | 1/50 | 400 |
| 2 | 1/25 | 400 |

FIG.8A

| EXPOSURE VALUE | SHUTTER SPEED (SECOND) | ISO SENSITIVITY |
|---|---|---|
| -2 | 1/100 | 100 |
| -1 | 1/100 | 200 |
| 0 | 1/100 | 400 |
| 1 | 1/100 | 800 |
| 2 | 1/100 | 1600 |

FIG.8B

| EXPOSURE VALUE | SHUTTER SPEED (SECOND) | ISO SENSITIVITY |
|---|---|---|
| -2 | 1/200 | 200 |
| -1 | 1/150 | 300 |
| 0 | 1/100 | 400 |
| 1 | 1/75 | 600 |
| 2 | 1/50 | 800 |

FIG.8C

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | +1 | +2 | 0 | 0 | 0 | 0 | 0 |
| 0 | 0 | 0 | 0 | 0 | +1 | +1 | +2 | +2 | 0 | 0 | 0 | 0 |
| 0 | 0 | 0 | 0 | 0 | +1 | +1 | +2 | +2 | 0 | 0 | 0 | 0 |
| 0 | 0 | 0 | 0 | 0 | +1 | +1 | +2 | +2 | 0 | 0 | 0 | 0 |
| 0 | 0 | 0 | 0 | 0 | 0 | +1 | +2 | 0 | 0 | 0 | 0 | 0 |
| 0 | 0 | 0 | 0 | +1 | +1 | +1 | +2 | +2 | +2 | 0 | 0 | 0 |
| 0 | 0 | 0 | +1 | +1 | +1 | +1 | +2 | +2 | +2 | +2 | 0 | 0 |

FIG.12A

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | +1 | +2 | 0 | 0 | 0 | 0 | 0 |
| 0 | 0 | 0 | 0 | 0 | +1 | +1 | +2 | +2 | 0 | 0 | 0 | 0 |
| 0 | 0 | 0 | 0 | 0 | +1 | +1 | +2 | +2 | 0 | 0 | 0 | 0 |
| 0 | 0 | 0 | 0 | 0 | +1 | +1 | +2 | +2 | 0 | 0 | 0 | 0 |
| 0 | 0 | 0 | 0 | 0 | 0 | +1 | +2 | 0 | 0 | 0 | 0 | 0 |
| 0 | 0 | 0 | 0 | +1 | +1 | +1 | +2 | +2 | +2 | 0 | 0 | 0 |
| 0 | 0 | 0 | +1 | +1 | +1 | +1 | +2 | +2 | +2 | +2 | 0 | 0 |

FIG.12B

DEVICE, CONTROL METHOD, AND STORAGE MEDIUM

CROSS-REFERENCE TO RELATED APPLICATIONS

This application is a continuation of U.S. application Ser. No. 16/898,476, filed Jun. 11, 2020, which is a Continuation of International Patent Application No. PCT/JP2018/046254, filed Dec. 17, 2018, which claims the benefit of Japanese Patent Application No. 2017-241983, filed Dec. 18, 2017, both of which are hereby incorporated by reference herein in their entirety.

BACKGROUND OF THE INVENTION

Field of the Invention

The technique of this disclosure relates to a device, a control method, and a storage medium capable of acquiring a high dynamic range image.

Background Art

There is conventionally known a technique of generating a high dynamic range image (hereinafter referred to as "HDR image") with a wide dynamic range in a digital camera, a digital video camera, and the like. PTL 1 discloses a method of acquiring an HDR image by one time image capturing by image capturing an object using an image capturing element capable of controlling different exposure conditions for each pixel. According to the method disclosed in PTL 1, an image multivalued by applying a low-pass filter to an image binarized using luminance is used as an exposure time map, thereby preventing the occurrence of a false contour at the boundary between pixels of different exposure times.

In the case of setting different exposure times for each pixel in image capturing, a long exposure time is set for a pixel corresponding to a dark object. Depending on exposure conditions, however, the long exposure time may cause a blur in the acquired HDR image.

The technique of this disclosure has been accomplished in view of the above problem and aims to generate a high quality HDR image in the case of setting different exposure conditions for each area in image capturing.

CITATION LIST

Patent Literature

PTL 1 Japanese Patent Laid-Open No. 2011-004088

SUMMARY OF THE INVENTION

A device according to the technique of this disclosure is a device configured to control an image capturing element capable of controlling an exposure condition for each of areas, the device comprising: an acquisition unit configured to acquire an exposure value map obtained by preliminary exposure using the image capturing element; and a setting unit configured to set the exposure condition including a shutter speed and an ISO sensitivity for each of the areas based on the exposure value map.

Further features of the technique of this disclosure will become apparent from the following description of an exemplary embodiment to be given with reference to the attached drawings.

BRIEF DESCRIPTION OF THE DRAWINGS

FIG. 8A is a diagram showing a specific example of exposure conditions in a correction target area;

FIG. 8B is a diagram showing a specific example of exposure conditions in the correction target area;

FIG. 8C is a diagram showing a specific example of corrected exposure conditions in the correction target area;

FIG. 12A is a diagram showing an example of an exposure value map before setting a correction target area; and FIG. 12B is a diagram showing an example of an exposure value map after setting a correction target area.

DESCRIPTION OF THE EMBODIMENTS

First Embodiment

In the first embodiment, a description will be given of a method of generating an HDR image by controlling exposure conditions for each area. In particular, both of an exposure time (shutter speed) and an ISO sensitivity (analog gain) are controlled for each area, thereby performing image capturing depending on the brightness of each area.

Configuration of Image Capturing Device

Figure 1:
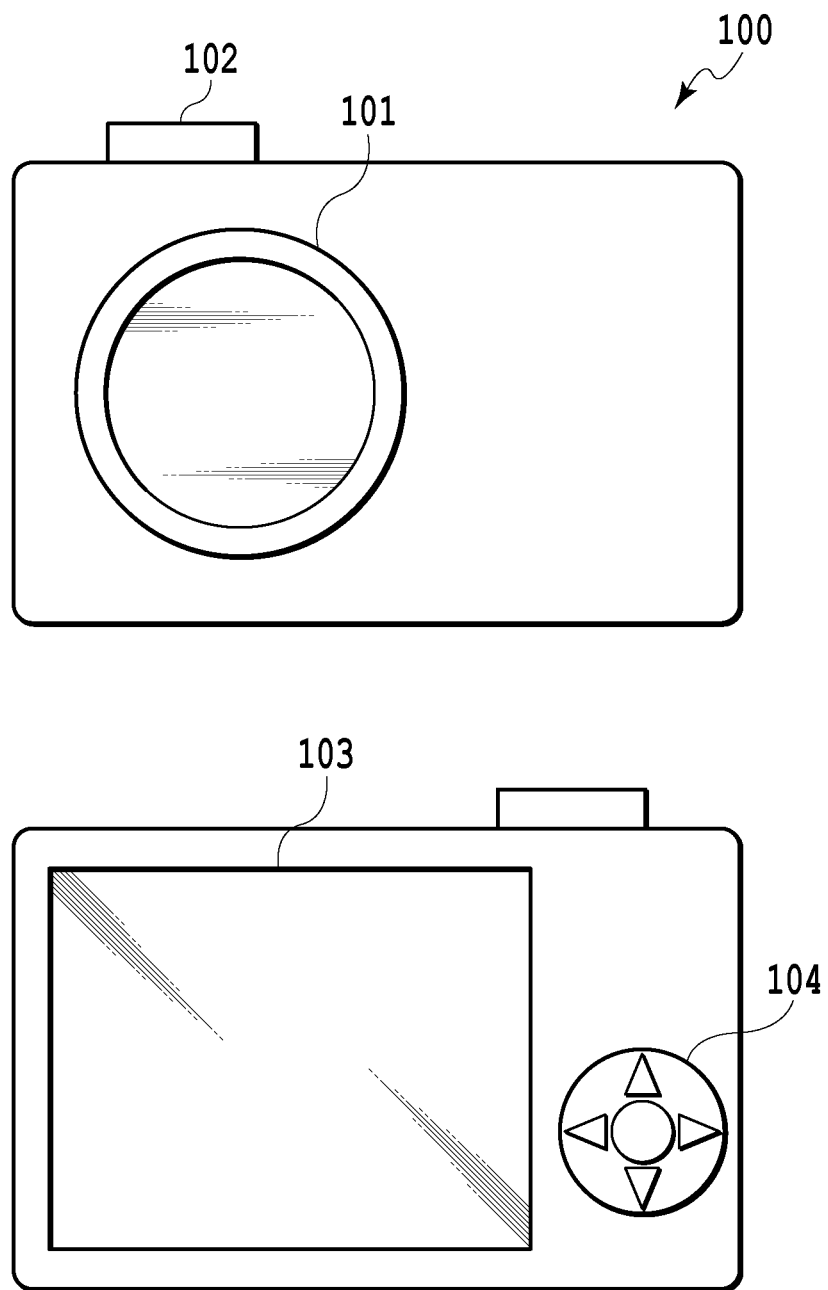
FIG. 1 is a schematic diagram showing an example of the appearance of an image capturing device in a first embodiment.

FIG. 1 is a schematic diagram showing an example of the appearance of an image capturing device in the present embodiment. An image capturing device 100 comprises an optical unit 101, an image capturing button 102, a display unit 103, and an operation button 104. The optical unit 101 includes a zoom lens, a focus lens, a blur correction lens, a diaphragm, and a shutter to concentrate light information on an object. The image capturing button 102 is a button for accepting an image capturing instruction from a user. The display unit 103 includes a liquid crystal display or the like to display image data processed by the image capturing device 100 and various types of data. The operation button 104 functions as an operation unit for accepting various instructions from a user. For example, a user can input an exposure condition to the image capturing device 100 via the operation button 104.

Hardware Configuration of Image Capturing Device

Figure 2:
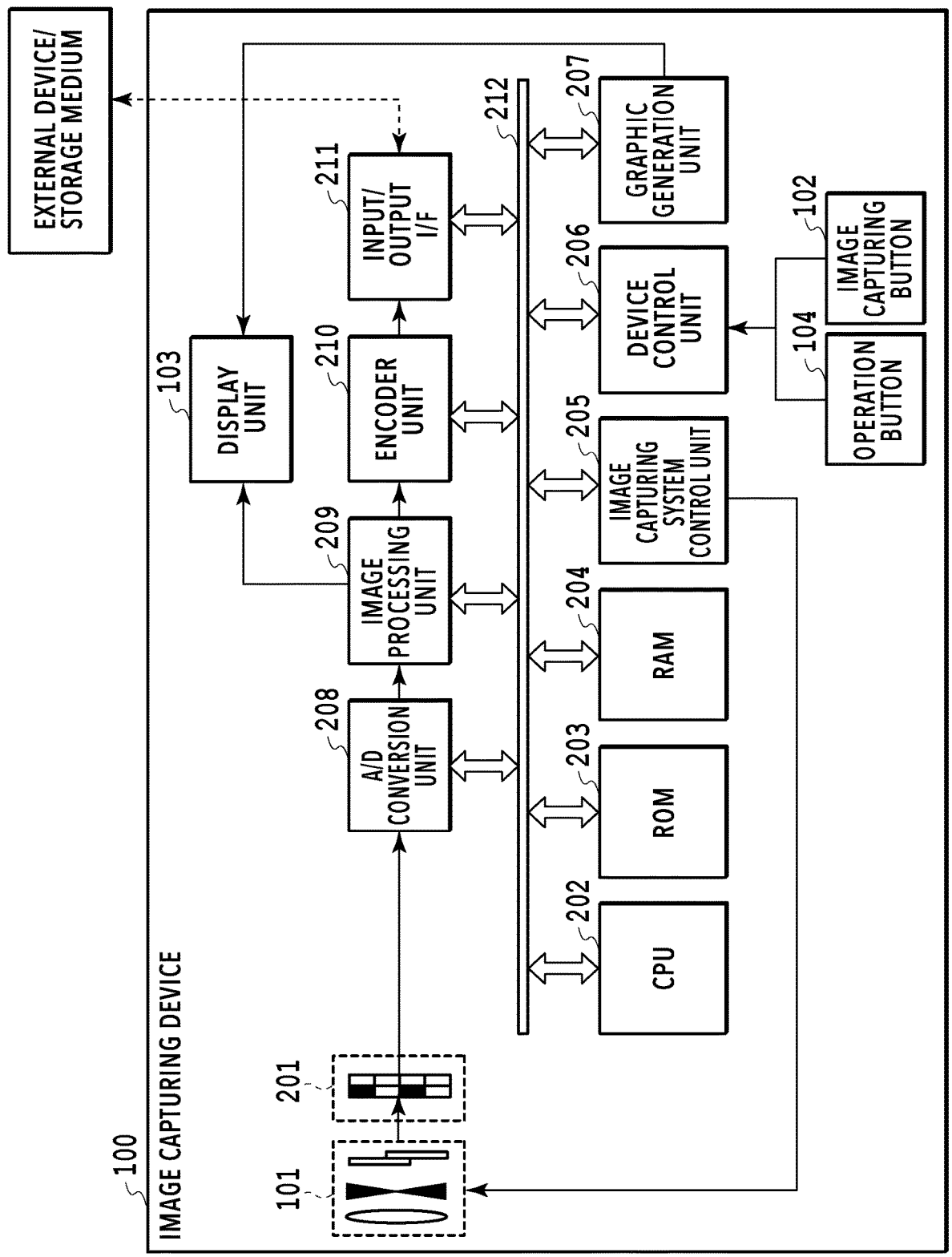
FIG. 2 is a diagram showing an example of the hardware configuration of the image capturing device in the first embodiment.

FIG. 2 is a block diagram showing an example of the hardware configuration of the image capturing device 100 in the present embodiment. An image capturing element unit 201 is a group of image capturing elements that convert light concentrated by the optical unit 101 into a current value. The image capturing device 100 can acquire color information by using the image capturing element unit 201 in combination with a color filter and the like. In the present embodiment, an HDR sensor capable of setting exposure conditions for each pixel or each area is applied to the image capturing element unit 201. In the present embodiment, "exposure condition" is a general term of parameters concerning the brightness of an image. The image capturing element unit 201 acquires an HDR image by adaptively controlling exposure conditions (such as an exposure time and analog gain) for each pixel or each area. In the case of controlling exposure in units of areas, exposure conditions are generally controlled for each 2×2 or 3×2 pixel area, but the embodiment is not limited to this.

A CPU 202 has control over each constitutional element of the image capturing device 100 and sequentially reads commands stored in a storage area such as a read only memory (ROM) 203 into a random access memory (RAM) 204. The CPU 202 interprets the read command and executes processing according to the result of interpretation. An image capturing system control unit 205 performs control according to an instruction from the CPU 202 such that, for example, the optical unit 101 focuses, opens the shutter, or adjusts the aperture. A device control unit 206 performs control according to a user instruction accepted via the image capturing button 102 such that, for example, the image capturing device 100 starts or finishes image capturing operation. The device control unit 206 also performs control according to a user instruction accepted via the operation button 104 such that, for example, the display unit 103 displays a predetermined operation screen. A graphic generation unit 207 functions as a display control unit of the image capturing device 100 and generates an image signal indicating a character, figure, image or the like to be displayed on the display unit 103. An A/D conversion unit 208 converts the amount of light of an object detected by the image capturing element unit 201 into a digital signal. An image processing unit 209 processes the digital signal converted by the A/D conversion unit 208, thereby processing image data corresponding to the digital signal. An encoder unit 210 converts the image data processed by the image processing unit 209 into a file format such as jpeg. An input/output interface ("interface" will be hereinafter referred to as "I/F") 211 is an I/F used to transmit/receive image data to/from an external device such as a PC or various storage media (such as a hard disk, memory card, CF card, and SD card). The constitutional elements of the image capturing device 100 described above are connected via a system bus 212 so as to communicate with each other.

Functional Configuration of Image Capturing Device

Figure 3:
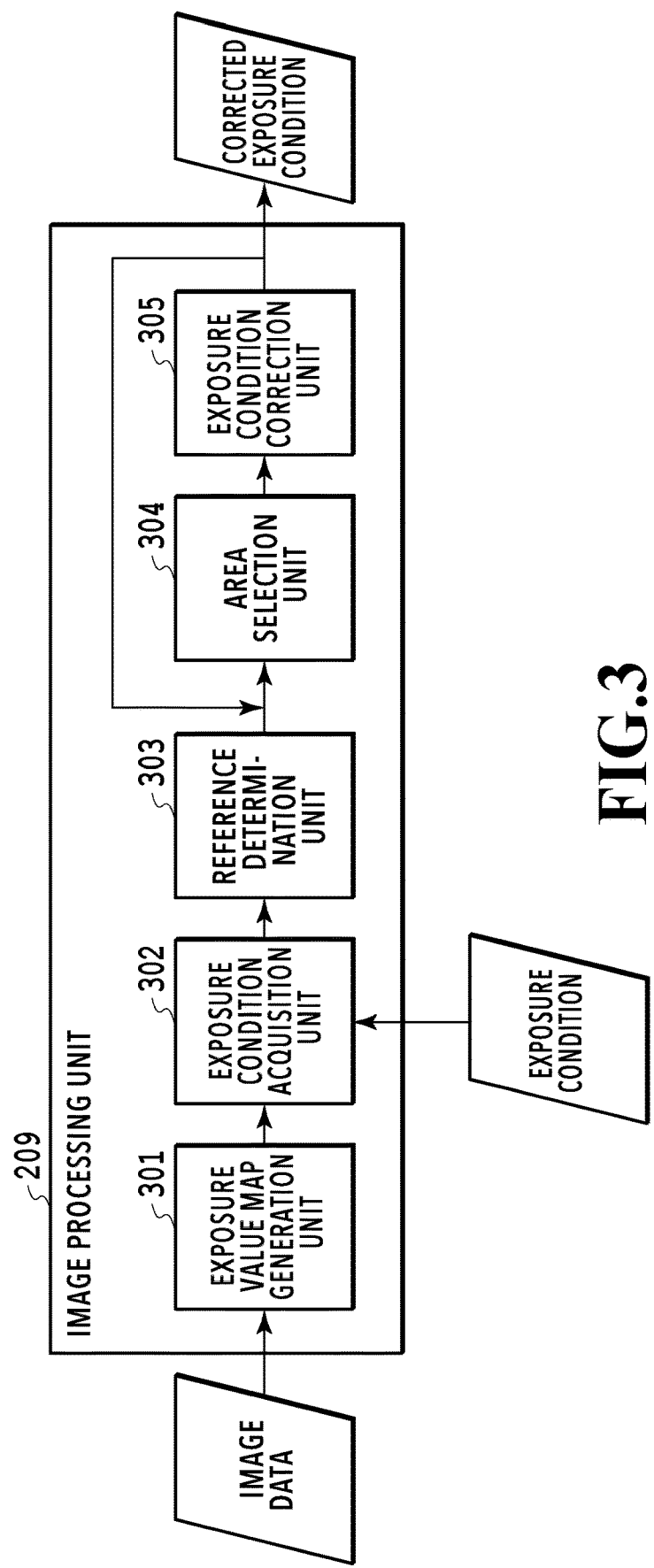
FIG. 3 is a block diagram showing an example of the functional configuration of an image processing unit in the first embodiment.

FIG. 3 is a block diagram showing the functional configuration of the image processing unit 209 in the present embodiment. The function of each block shown in FIG. 3 is implemented by the CPU 202 reading a program code stored in the ROM 203 into the RAM 204 and executing the code. Alternatively, some or all of the functions of the blocks in FIG. 3 may be implemented by hardware such as an ASIC or electronic circuit. The same applies to the block diagram subsequent to FIG. 3.

In the image capturing device 100 of the present embodiment, the image processing unit 209 comprises an exposure value map generation unit 301, an exposure condition acquisition unit 302, a reference determination unit 303, an area selection unit 304, and an exposure condition correction unit 305. The exposure value map generation unit 301 generates, according to image data sent from the A/D conversion unit 208 in preliminary exposure, an exposure value map in which an exposure value is stored for each pixel. An exposure value is a parameter for controlling brightness recorded using an ISO sensitivity and an exposure time. The exposure condition acquisition unit 302 reads exposure conditions corresponding to the exposure value and acquires exposure conditions for each area. The reference determination unit 303 determines reference exposure conditions based on a plurality of exposure conditions. The area selection unit 304 selects a correction target area for which exposure conditions are to be corrected from among areas partitioned in preliminary exposure. The exposure condition correction unit 305 corrects the exposure conditions for the correction target area based on the reference exposure conditions.

Main Procedure

Figure 4:
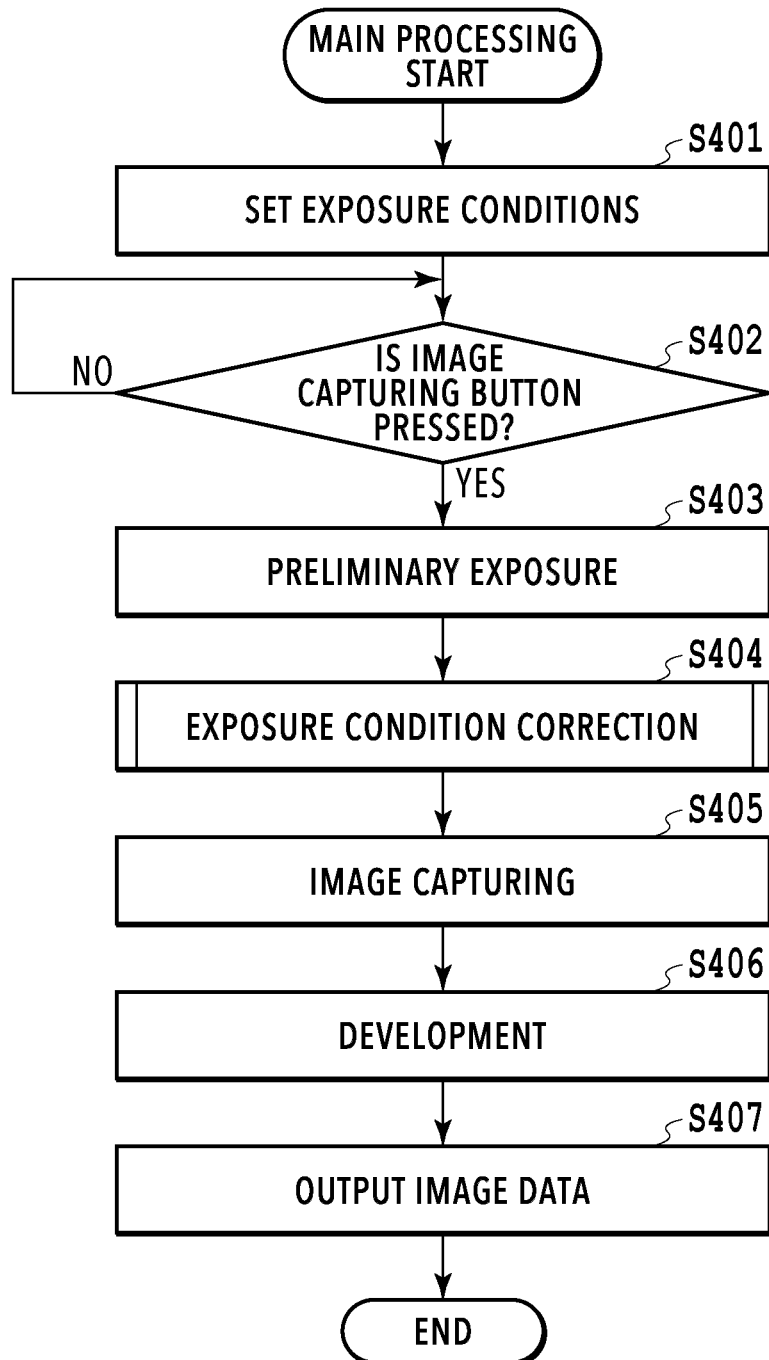
FIG. 4 is a flowchart showing an example of a main procedure in the first embodiment.

FIG. 4 is a flowchart showing a main procedure of the image capturing device 100 in the present embodiment. The processing in the flowchart shown in FIG. 4 is performed by the CPU 202 reading a program code stored in the ROM 203 into the RAM 204 and executing the code. In the description below, sign "S" indicates a step in the flowchart. The same applies to the flowcharts subsequent to FIG. 4.

Figure 5:
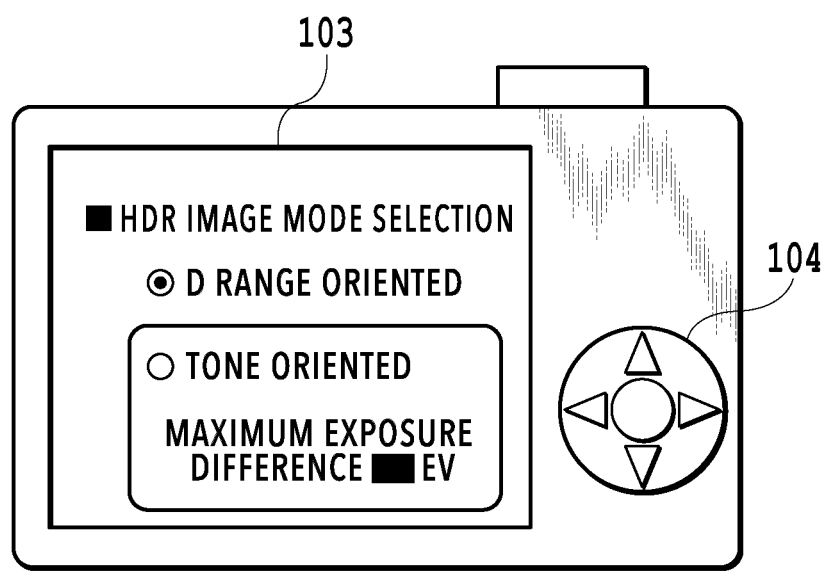
FIG. 5 is a diagram showing an example of a UI of the image capturing device in the first embodiment.

In S401, the device control unit 206 sets exposure conditions such as a lens aperture value, a shutter speed, and an ISO sensitivity according to a user instruction accepted via the operation button 104. In the present embodiment, the shutter speed and the ISO sensitivity, which are also camera parameters, correspond to the exposure time and the analog gain, respectively. Exposure conditions other than these camera parameters may be set according to an image capturing mode. FIG. 5 is a diagram showing an example of a user interface ("user interface" will be hereinafter referred to as "UI") of the image capturing device 100 in the present embodiment. FIG. 5 shows an UI for setting an HDR image capturing mode, the UI being displayed on the display unit 103. A user can select a desired image capturing mode by inputting an instruction via the operation button 104. The image capturing mode set in S401 is not limited to the HDR image capturing mode and may be an image capturing mode other than the HDR image capturing mode such as an image capturing mode according to the type of object such as a person or scenery or an image capturing mode according to a weather such as sunny or cloudy.

In S402, the device control unit 206 determines whether the image capturing button 102 has been pushed. In a case where the image capturing button 102 has been pushed (S402: YES), the processing proceeds to S403. In a case where the image capturing button 102 has not been pushed (S402: NO), S402 is repeated.

In preliminary exposure in S403, exposure conditions for each area in the image capturing element unit 201 are set. More specifically, the exposure value map generation unit 301 generates an exposure value map in which an exposure value is stored for each pixel according to image data sent from the A/D conversion unit 208 in the preliminary exposure. The image processing unit 209 (exposure condition acquisition unit 302) of the present embodiment can read exposure conditions (FIG. 8A to FIG. 8C) corresponding to an exposure value and acquire exposure conditions for each area. A description will be given of settings of exposure conditions for each area of the image capturing element unit 201 with reference to FIG. 6A to FIG. 6C.

Figure 6A:
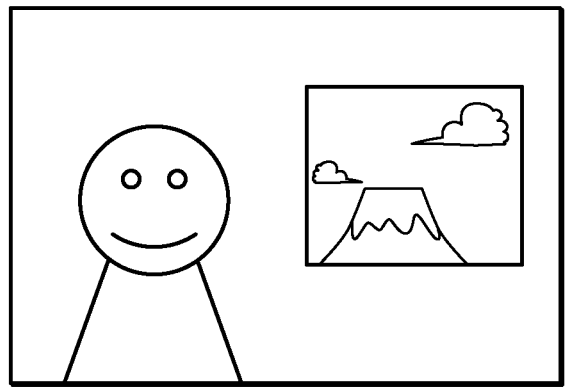
FIG. 6A is a schematic diagram showing an example of a scene to be captured in the first embodiment.

FIG. 6A is a schematic diagram showing an example of a scene to be captured in the present embodiment. In the scene to be captured in FIG. 6A, a person in a room is captured by the image capturing device 100. The room where the person is present has a window and light enters from outside through the window.

Figure 6B:
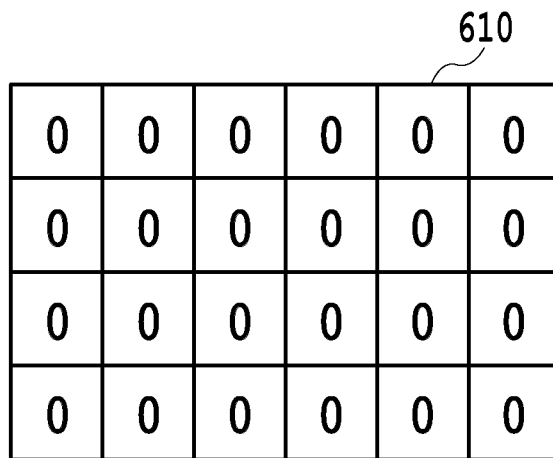
FIG. 6B shows an example of an exposure value map generated in an LDR image capturing mode.

FIG. 6B shows an example of an exposure value map generated in the case of capturing the scene in a low dynamic range (LDR) image capturing mode in the present embodiment. The LDR image capturing mode is a mode for acquiring a captured image with a dynamic range narrower than that in the HDR image capturing mode and is applied, for example, in a case where "tone oriented" is selected in the UI shown in FIG. 5. In the LDR image capturing mode, settings are made such that exposure is appropriate for the person. At this time, since an exposure value shown in the exposure value map in FIG. 6B is set for the entire scene to be captured shown in FIG. 6A, overexposure occurs in the window area brighter than the inside of the room where the person is present.

Figure 6C:
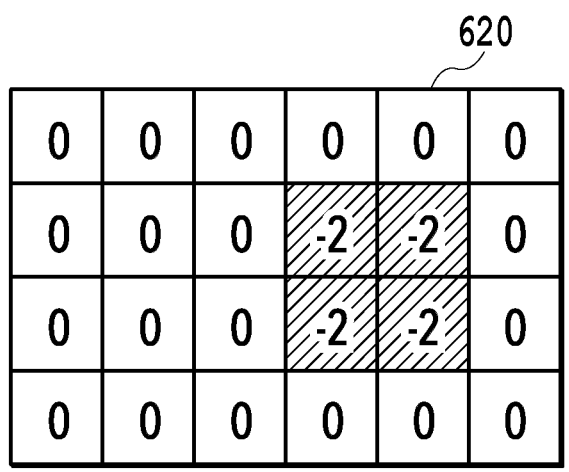
FIG. 6C shows an example of an exposure value map generated in an HDR image capturing mode.

FIG. 6C shows an example of the exposure value map generated in the case of capturing the scene in the HDR image capturing mode in the present embodiment. The HDR image capturing mode is a mode for acquiring a captured image with a dynamic range wider than that in the LDR image capturing mode and is applied, for example, in a case where "D range oriented" is selected in the UI shown in FIG. 5. At this time, the exposure value shown in the exposure value map in FIG. 6B is set for the indoor area including the person and an exposure value lower than that for the indoor area is set for the window area, whereby overexposure in the window area can be suppressed.

Areas for which exposure values are to be set are not limited to those. For example, an exposure value may be set for each pixel as shown in FIG. 6C. Alternatively, an exposure value may be set for a relatively large area such as the area corresponding to the window.

Returning to the flowchart of FIG. 4, in S404, the exposure conditions set in the preliminary exposure in S403 are corrected so as to reduce differences in exposure conditions between the areas.

Correction Procedure of Exposure Conditions

Figure 7:
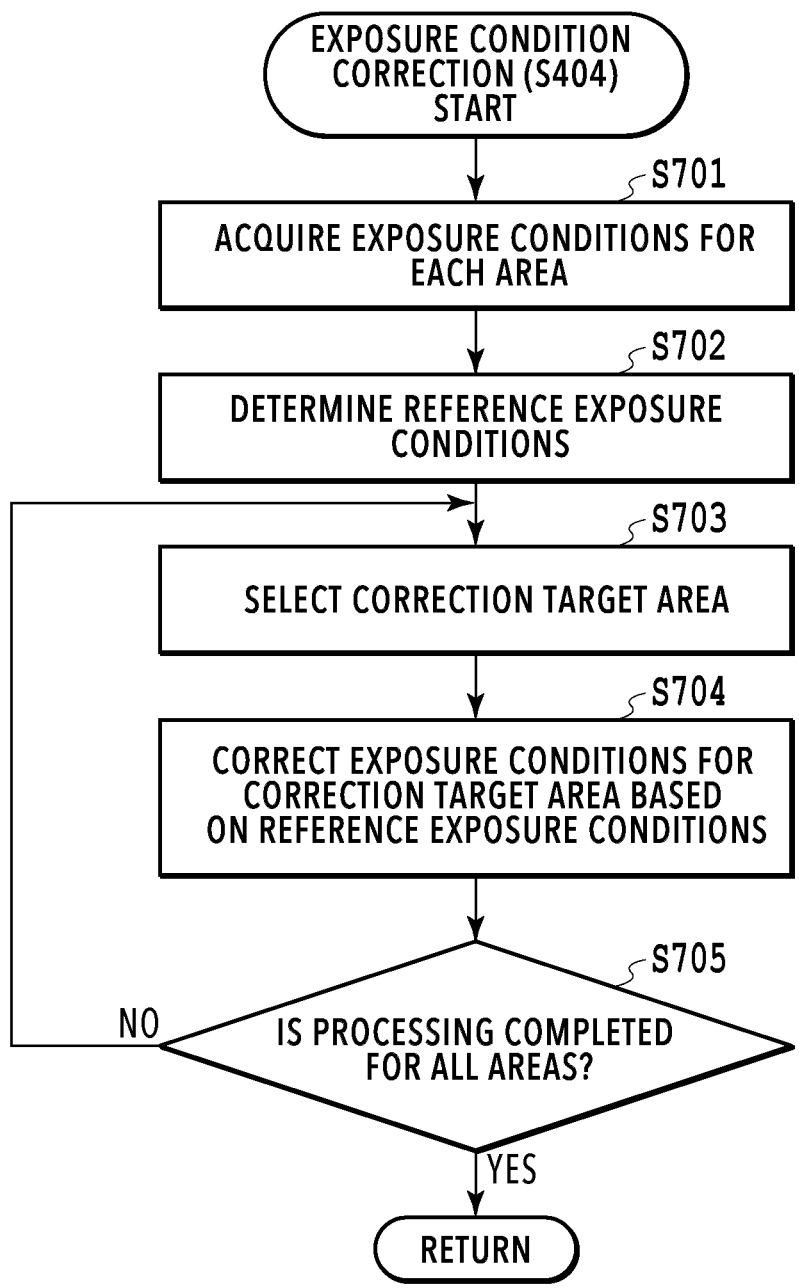
FIG. 7 is a flowchart showing an example of a correction procedure of an exposure condition in the first embodiment.

FIG. 7 is a flowchart showing an example of a correction procedure of exposure conditions in S404 in the present embodiment. The exposure condition correction processing will be described in detail with reference to the flowchart of FIG. 7.

In S701, the exposure condition acquisition unit 302 acquires exposure conditions for each area from the exposure conditions set in S401 and the exposure value map generated in S403.

In S702, the reference determination unit 303 determines exposure conditions to be a reference (hereinafter referred to as "reference exposure conditions") based on the exposure conditions acquired in S701. In the present embodiment, the reference exposure conditions determined in S702 are a shutter speed and an ISO sensitivity. As the reference exposure conditions, for example, exposure conditions corresponding to an area of a main object in a captured image obtained by capturing the scene to be captured of FIG. 6A may be selected.

The method of determining the reference exposure conditions is not limited to the method of selecting exposure conditions corresponding to an area of a main object, provided that the reference exposure conditions can be suitably selected according to a scene to be captured. For example, in the case of using a focused area as a reference, exposure conditions corresponding to the focused area can be automatically determined as the reference exposure conditions. In the case of accepting selection of a desired area via the operation button 104, exposure conditions corresponding to the desired area can be determined as the reference exposure conditions. Alternatively, the reference determination unit 303 can determine exposure conditions corresponding to an arbitrary area as the reference exposure conditions based on the exposure conditions acquired in S701.

In S703, the area selection unit 304 selects a correction target area for which exposure conditions are to be corrected from among areas partitioned in the preliminary exposure in S403. The area selection unit 304 can select the correction target area in an arbitrary order each time the loop processing from S703 to S705 is executed. For example, the area selection unit 304 may select the correction target area while scanning an area of interest in the order from upper left to lower right of the captured image. At this time, in a case where a difference between the reference exposure condition and exposure condition for the correction target area is small, the advantageous result obtained by correcting the exposure condition also becomes small. Thus, an area of interest may be selected as the correction target area in a case where the difference between the reference exposure condition and the exposure condition for the area of interest is larger than a predetermined threshold.

In S704, the exposure condition correction unit 305 corrects the exposure conditions for the correction target area selected in S703 based on the reference exposure conditions determined in S702. The exposure condition correction processing will be described in detail with reference to FIG. 8A to FIG. 8C.

FIG. 8A and FIG. 8B are tables showing specific examples of exposure conditions set in S401 for a correction target area. On the other hand, FIG. 8C is a table showing a specific example of exposure conditions corrected in S704 for a correction target area. The exposure condition acquisition unit 302 can acquire exposure conditions corresponding to an exposure value of each area (pixel) stored in the exposure value map by referring to the tables of FIG. 8A and FIG. 8B. For example, a description will be given of a case where the shutter speed "1/100 sec" and the ISO sensitivity "400" associated with the exposure value "0" are set as reference exposure conditions.

FIG. 8A shows an example of adjusting exposure conditions by changing only the shutter speed. Since the exposure value of the person area is "0" in the scene to be captured of FIG. 6A, exposure conditions set for the person area are the shutter speed "1/100 sec" and the ISO sensitivity "400." In contrast, since the exposure value of the window area is "−2," exposure conditions set for the window area are the shutter speed "1/400 sec" and the ISO sensitivity "400." At this time, the shutter speed differs four times between the person area and the window area. Accordingly, in a case where the scene to be captured of FIG. 6A includes a moving object, the amount of movement also differs four times between the areas. As a result, in a case where the exposure values are adjusted based on only the shutter speed, a blur occurs in some local areas. In addition, the aspect of output such as a blur or multiple overlapping image may largely differ between local areas in an HDR image.

FIG. 8B shows an example of adjusting exposure conditions by changing only the ISO sensitivity. Since the exposure value of the person area is "0" in the scene to be captured of FIG. 6A, exposure conditions set for the person area are the shutter speed "1/100 sec" and the ISO sensitivity "400." In contrast, since the exposure value of the window area is "−2," exposure conditions set for the window area are the shutter speed "1/100 sec" and the ISO sensitivity "100." At this time, the ISO sensitivity differs four times between the person area and the window area. Accordingly, in a case where the scene to be captured of FIG. 6A includes a moving object, the amount of noise also differs four times between the areas. As a result, in a case where the exposure values are adjusted based on only the ISO sensitivity, the amount of noise increases in some local areas. In addition, the aspect of output of noise may largely differ between local areas in an HDR image. In other words, a difference in level of noise may be observed between local areas.

FIG. 8C shows an example of exposure conditions corrected by the exposure condition correction unit 305. Since the exposure value of the person area is "0" in the scene to be captured of FIG. 6A, exposure conditions set for the person area are the shutter speed "1/100 sec" and the ISO sensitivity "400." In contrast, since the exposure value of the window area is "−2," exposure conditions set for the window area are the shutter speed "1/200 sec" and the ISO sensitivity "200." At this time, a difference between the reference shutter speed "1/100" and the corrected shutter speed "1/200" to be set for the person area is reduced to two times. Similarly, a difference between the reference ISO sensitivity "400" and the corrected ISO sensitivity "200" to be set for the window area is also reduced to two times. In this manner, the exposure condition correction unit 305 controls not either but both of the shutter speed and the ISO sensitivity, thereby reducing the adverse effect of controlling only either one of these conditions. Further, correcting the shutter speed and the ISO sensitivity at the same or substantially the same rate enables a reduction in a difference in aspect of appearance of a blur or noise between local areas. In addition, since correction is made not only to exposure conditions corresponding to the boundary between the correction target area and the adjacent area but to exposure conditions corresponding to the entire correction target area, a false contour can also be reduced in an HDR image. As a result, according to the control method of the image capturing device in the present embodiment, a high quality HDR image can be generated in the case of setting different exposure conditions for each area in image capturing.

The correction described above may be made according to a desired method as long as differences between the reference exposure conditions and exposure conditions for each area can be reduced. For example, on the assumption that the exposure value in the reference exposure conditions is E, the shutter speed is T, the ISO sensitivity is G, the exposure value of the correction target area is E', the corrected shutter speed is T', and the corrected ISO sensitivity is G', T' and G' can be calculated by the following formulae, respectively:

$$T' = T * 2^{\alpha(E'-E)} \qquad \text{(formulae 1)}$$

$$G' = G * 2^{(1-\alpha)(E'-E)} \qquad \text{(formulae 2)}$$

In the above formulae, α is a coefficient that is a real number satisfying 0.0≤α≤1.0. FIG. 8A corresponds to the case of =1.0, FIG. 8B corresponds to the case of α=0.0, and FIG. 8C corresponds to the case of α=0.5. The above formulae are not necessarily used and an arbitrarily adjusted coefficient α may be used instead.

Figure 9:
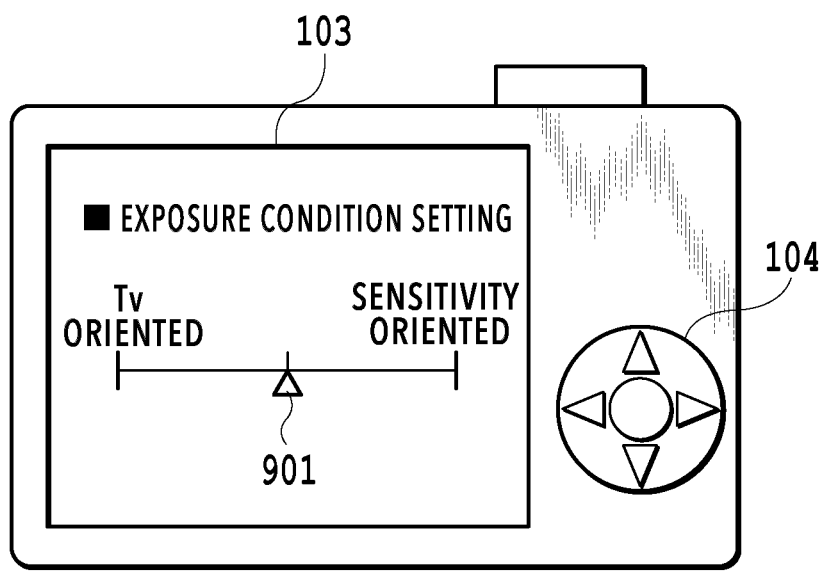
FIG. 9 is a diagram showing an example of a UI for adjusting the amount of correction in the first embodiment.

FIG. 9 is a diagram showing an example of a UI for adjusting the amount of correction in the present embodiment. As shown in the example of the UI in FIG. 9, a user can adjust the coefficient α by moving a knob 901 of a slider bar included in the UI right or left. For example, in a case where the knob is moved right (direction of "sensitivity oriented") to reduce a, a difference between the reference shutter speed and the shutter speed in the correction target area is reduced, whereby the occurrence of a blur or multiple overlapping image caused by a moving object can be more reduced. In contrast, in a case where the knob is moved left (direction of "Tv oriented") to increase a, a difference between the reference ISO sensitivity and the ISO sensitivity in the correction target area is reduced, whereby the occurrence of a difference in level of noise can be more reduced. In this manner, the exposure condition correction unit 305 can correct the shutter speed and the ISO sensitivity at weighted rates, thereby reducing a difference in aspect of appearance of a blur or noise between local areas.

Returning to the flowchart of FIG. 7, in S705, the exposure condition correction unit 305 determines whether the processing has been completed for all the areas. In a case where the processing has been completed for all the areas (S705: YES), the processing returns to the flowchart of FIG. 4. In a case where the processing has not been completed for all the areas (S705: NO), the processing returns to S703 to perform the loop processing from S703 to S705.

Returning to the flowchart of FIG. 4, in S405, the image capturing system control unit 205 causes the image capturing system to perform image capturing operation based on the exposure conditions corrected in S404. In image capturing in S405, the image capturing system control unit 205 drives the optical unit 101 to acquire the amounts of light of objects, and the acquired amounts of light are detected by the image capturing element unit 201. The A/D conversion unit 208 converts the amounts of light detected by the image capturing element unit 201 into an electric signal to acquire RAW image data. As publicly known in the technical field of image processing, RAW image data is image data in which any one of R, G, and B color components is stored in each pixel in a predetermined arrangement such as the Bayer arrangement.

In S406, the image processing unit 209 performs development processing for the RAW image data. By applying development processing to the RAW image data, RGB image data (3-channel image data having all of the R, G, and B color components in each pixel) is generated. Although the development processing is generally accompanied with sub-processing such as white balance processing, demosaicing processing, and gamma processing, the description thereof will be omitted since they are not the main focus of the present embodiment.

In S407, the image processing unit 209 outputs the RGB image data generated in S406. The output RGB image data is sent to the encoder unit 210 and converted into a file format such as jpeg. Next, the RGB image data is output to an external device or storage medium via the input/output I/F 211. Upon the completion of S407, the flowchart is finished.

As described above, according to the control method of the image capturing device of the present embodiment, in the case of setting different exposure conditions for each area in image capturing, the shutter speed and the ISO sensitivity are controlled, thereby reducing the adverse effect of controlling only either one of these conditions. Therefore, according to the control method of the image capturing device of the present embodiment, a difference in aspect of appearance of a blur or noise between local areas and a false contour can be reduced and a high quality HDR image can be generated.

Second Embodiment

In the correction processing of exposure conditions in the first embodiment (S404), exposure conditions for the correction target area are corrected based on the reference exposure conditions. However, in a case where a difference between the reference exposure condition and the exposure condition for the correction target area are small, the advantageous result obtained by correcting the exposure condition also becomes small. Therefore, in the present embodiment, a difference in exposure condition between adjacent areas is considered. In case where there the difference is large, exposure conditions for an area of interest are corrected. The description of the same features as those of the first embodiment will be simplified or omitted and features unique to the present embodiment will be mainly described.

Functional Configuration of Image Capturing Device

Figure 10:
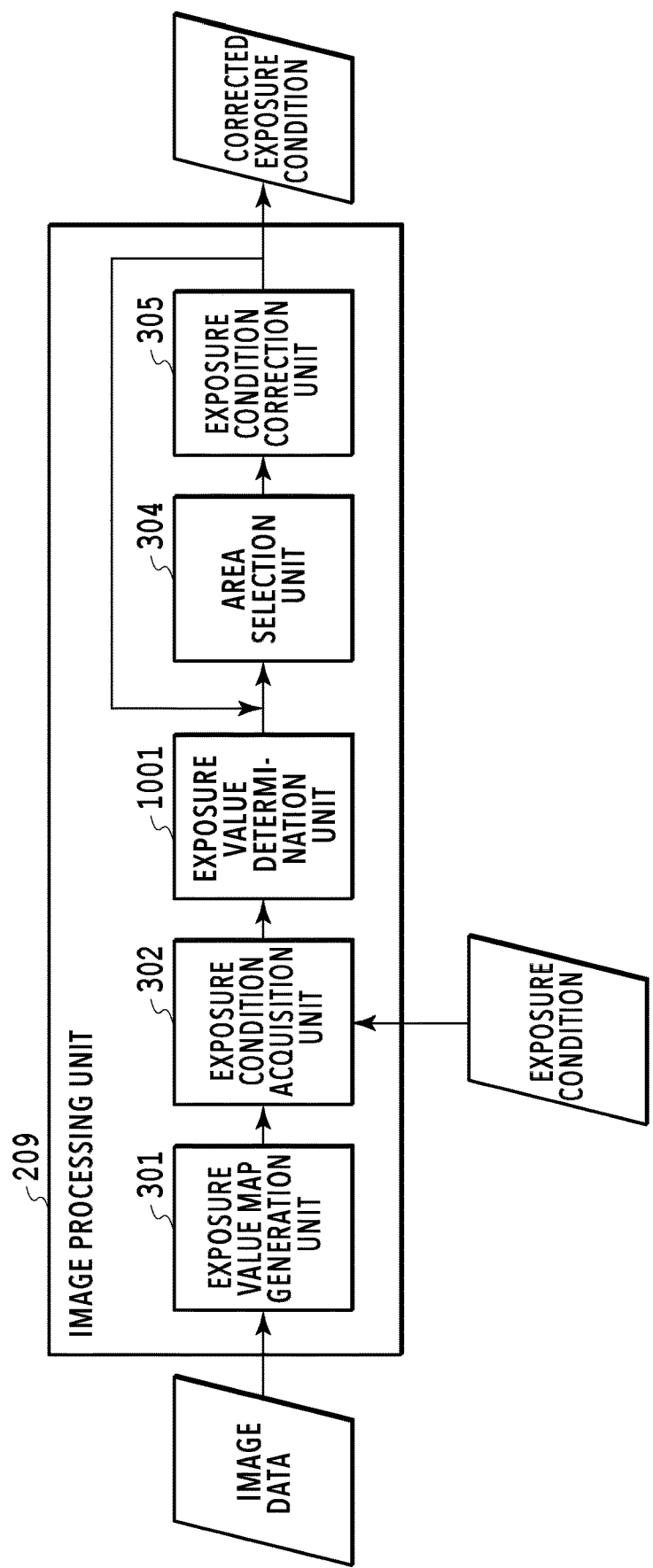
FIG. 10 is a block diagram showing an example of the functional configuration of an image capturing device in a second embodiment.

FIG. 10 is a block diagram showing the functional configuration of the image capturing device 100 in the present embodiment.

The image processing unit 209 of the present embodiment comprises an exposure value determination unit 1001 instead of the reference determination unit 303 in the first embodiment. The exposure value determination unit 1001 determines whether an area of interest out of areas partitioned in preliminary exposure is a correction target area to be a target of correction.

Correction Procedure of Exposure Conditions

Figure 11:
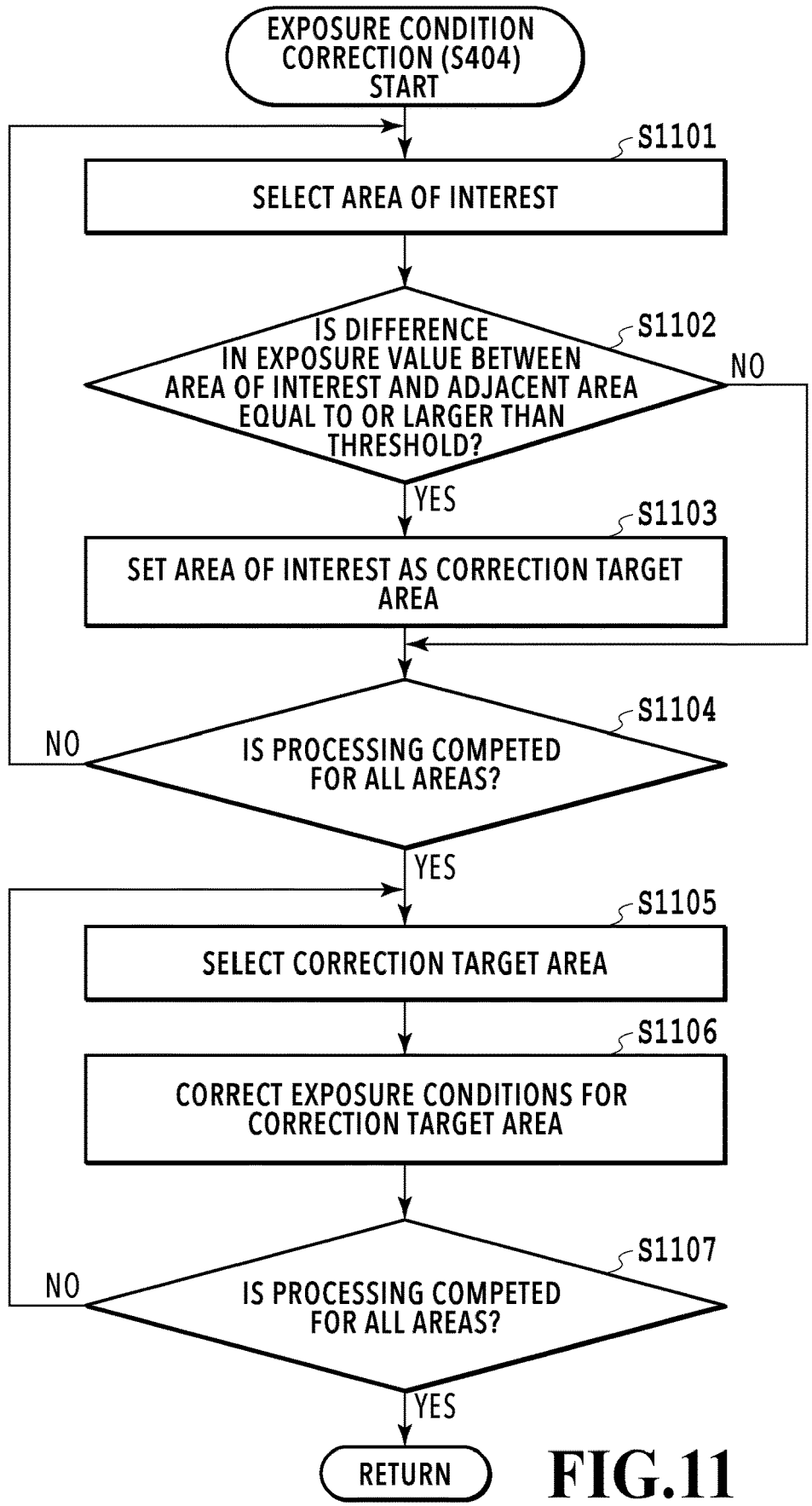
FIG. 11 is a flowchart showing an example of a correction procedure of an exposure condition in the second embodiment.

FIG. 11 is a flowchart showing the correction procedure of exposure conditions in S404 in the present embodiment. The exposure condition correction processing will be described in detail with reference to the flowchart of FIG. 11.

First, in the loop processing from S1101 to S1104, a correction target area for which exposure conditions are to be corrected is determined.

In S1101, the exposure value determination unit 1001 selects an area of interest from among areas of the image capturing element unit 201 partitioned in the preliminary exposure. The area of interest can be selected in an arbitrary order each time the loop processing from S1101 to S1104 is executed. For example, the area may be selected in the order from upper left to lower right in the captured image.

In S1102, the exposure value determination unit 1001 compares an exposure value of the area of interest selected in S1101 and an exposure value of an adjacent area adjacent to the area of interest. In a case where a difference in exposure value is equal to or larger than a predetermined threshold (S1102: YES), the processing proceeds to S1103. In a case where the difference in exposure value is smaller than the predetermined threshold (S1102: NO), the processing skips S1103 and proceeds to S1104.

In S1103, the exposure value determination unit 1001 determines the area of interest as a correction target area.

The method of determining the correction target area in the present embodiment will be described with reference to FIG. 12A and FIG. 12B.

FIG. 12A shows an example of an exposure value map input to the exposure value determination unit 1001. FIG. 12B shows an example of an exposure value map output from the exposure value determination unit 1001. That is, in the exposure value map shown in FIG. 12B, shaded areas are determined as the correction target areas. In the example of FIG. 12B, areas adjacent to the area of interest in eight directions (upper left, above, upper right, left, right, lower left, below, and lower right) are searched for. In a case where a difference in exposure value between the area of interest and an adjacent area is equal to or larger than 2, the area is determined as a correction target area. In this manner, based on the exposure value map generated by the preliminary exposure, an area largely different in exposure value from an adjacent area is determined as a correction target area. The method of determining the correction target area is not limited to above. Further, the difference in exposure value to be a determination condition may be other than "2."

Next, in the loop processing from S1105 to S1107, exposure conditions for the correction target area are corrected.

Returning to the flowchart of FIG. 11, in S1105, a correction target area for which exposure conditions are to be corrected is selected from among areas partitioned in the preliminary exposure in S403. The correction target area may be selected in an arbitrary order each time the loop processing from S1105 to S1107 is executed. For example, the area may be selected in the order from upper left to lower right in the captured image.

In S1106, the exposure condition correction unit 305 corrects exposure conditions for the correction target area selected in S1105. Since the method of correcting the exposure conditions is the same as that in the first embodiment, the description thereof is omitted.

In S1107, the exposure condition correction unit 305 determines whether the processing has been completed for all the areas. In a case where the processing has been completed for all the areas (S1107: YES), the processing returns to the flowchart of FIG. 4. In a case where the processing has not been completed for all the areas (S1107: NO), the processing returns to S1105 and executes the loop processing from S1105 to S1107.

As described above, according to the control method of the image capturing device of the present embodiment, in the case of setting different exposure conditions for each area in image capturing, if a difference in exposure condition between adjacent areas is large, correction is made so as to reduce the difference in exposure condition between the adjacent areas. Therefore, according to the control method of the image capturing device of the present embodiment, a high quality HDR image can be generated while reducing processing load caused by correction of exposure conditions, in addition to the advantageous result of the first embodiment.

OTHER EMBODIMENTS

Embodiment(s) of the technique of this disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the technique of this disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the device of the technique of this disclosure, a high quality HDR image can be generated in the case of setting different exposure conditions for each area in image capturing.

The invention claimed is:

1. A device configured to control an image capturing element capable of controlling an exposure condition for each of areas in an image, the device comprising one or more processors and one or more memories, the one or more processors and one or more memories being configured to function as a plurality of units comprising:
a setting unit configured to set the exposure condition including a shutter speed and an ISO sensitivity for each of the areas;
a capturing unit configured to capture the image based on the set exposure condition; and
a correction unit configured to correct the exposure condition for each of the areas based on a ratio of priority of the shutter speed and the ISO sensitivity of the exposure condition before capturing the image by the capturing unit.

2. The device according to claim 1, wherein the setting unit sets the exposure condition corresponding to a relatively bright area at a value lower than a value of the exposure condition corresponding to a relatively dark area.

3. The device according to claim 1, wherein the correction unit corrects the shutter speed and the ISO sensitivity of the exposure condition set for each of the areas such that a difference in exposure condition is small between at least some of areas in an image obtained by image capturing using the image capturing element.

4. The device according to claim 3, wherein the correction unit corrects each of the shutter speed and the ISO sensitivity of the exposure condition set for each of the areas such that an amount of correction of an exposure value is equal or substantially equal.

5. The device according to claim 3, wherein the plurality of units further comprises a determination unit configured to determine a reference exposure condition from among the exposure conditions set for the respective areas, and
wherein the correction unit corrects the shutter speed and the ISO sensitivity of the exposure condition set for each of the areas such that a difference from the reference exposure condition is small.

6. The device according to claim 5, wherein the determination unit determines an exposure condition for a focused area as the reference exposure condition.

7. The device according to claim 5, wherein the determination unit includes a display control unit configured to display, on a display unit, a UI for selecting an area of an exposure condition to be the reference exposure condition.

8. The device according to claim 5, wherein in a case where a difference between the reference exposure condition and an exposure condition set for an area of interest is equal to or larger than a predetermined threshold, the correction unit corrects a shutter speed and an ISO sensitivity of the exposure condition set for the area of interest such that the difference between the reference exposure condition and the exposure condition set for the area of interest is small.

9. The device according to claim 5, wherein the reference exposure condition is at least one of:
a shutter speed and an ISO sensitivity set for an area of a main object included in the image; and
a shutter speed and an ISO sensitivity set for an area focused in capturing the image;
a shutter speed and an ISO sensitivity set for an area selected via an operation unit.

10. The device according to claim 3, wherein in a case where a difference between exposure conditions set for adjacent areas out of the areas is equal to or larger than a predetermined threshold, the correction unit corrects the shutter speed and the ISO sensitivity of the exposure condition set for each of the areas such that the difference between the exposure conditions of the adjacent areas is small.

11. The device according to claim 3, wherein the correction unit corrects each of the shutter speed and the ISO sensitivity of the exposure condition set for each of the areas such that an amount of correction of an exposure value is a predetermined weighted rate.

12. The device according to claim 3, wherein the plurality of units further comprises a display control unit configured to display, on a display unit, a UI for adjusting an amount of correction of the shutter speed and the ISO sensitivity of the exposure condition set for each of the areas.

13. The device according to claim 1, wherein the plurality of units further comprises a development unit configured to perform development processing for image data acquired by image capturing using the image capturing unit, and
wherein the development processing comprises white balance processing, demosaicing processing, and gamma processing.

14. The device according to claim 1, further comprising a preliminary exposure unit configured to perform a preliminary exposure for determining the exposure condition.

15. The device according to claim 1, wherein the setting unit comprises a table storing each of an exposure value, a shutter speed, and an ISO sensitivity and selects the set exposure condition within the table.

16. A control method for controlling an image capturing element capable of controlling an exposure condition for each of areas in an image, the control method comprising:

a setting step of setting a shutter speed and an ISO sensitivity for each of the areas;

a capturing step of capturing the image based on the exposure condition; and a correction step of correcting the exposure condition for each of the areas based on a ratio of priority of the shutter speed and the ISO sensitivity before capturing the image.

17. A non-transitory computer-readable storage medium storing a program for causing a computer to execute each step in a control method for controlling an image capturing element capable of controlling an exposure condition for each of areas in an image, the method comprising:

a setting step of setting a shutter speed and an ISO sensitivity for each of the areas; and a correction step of correcting the exposure condition for each of the areas based on a ratio of priority of the shutter speed and the ISO sensitivity before capturing the image.

* * * * *